(12) United States Patent
Panov

(10) Patent No.: US 10,254,752 B2
(45) Date of Patent: Apr. 9, 2019

(54) ESTIMATION OF HEALTH PARAMETERS IN INDUSTRIAL GAS TURBINES

(71) Applicant: Siemens Aktiengesellschaft, Munich (DE)

(72) Inventor: Vili Panov, Lincoln (GB)

(73) Assignee: Siemens Aktiengesellschaft, Munich (DE)

( * ) Notice: Subject to any disclaimer, the term of this patent is extended or adjusted under 35 U.S.C. 154(b) by 302 days.

(21) Appl. No.: 15/113,848

(22) PCT Filed: Jan. 9, 2015

(86) PCT No.: PCT/EP2015/050335
§ 371 (c)(1),
(2) Date: Jul. 25, 2016

(87) PCT Pub. No.: WO2015/117791
PCT Pub. Date: Aug. 13, 2015

(65) Prior Publication Data
US 2016/0342154 A1 Nov. 24, 2016

(30) Foreign Application Priority Data
Feb. 7, 2014 (EP) .................................. 14154261

(51) Int. Cl.
*F02C 9/00* (2006.01)
*G05B 13/04* (2006.01)
(Continued)

(52) U.S. Cl.
CPC ............ *G05B 23/0221* (2013.01); *F02C 9/00* (2013.01); *G05B 13/048* (2013.01);
(Continued)

(58) Field of Classification Search
None
See application file for complete search history.

(56) References Cited

U.S. PATENT DOCUMENTS 4,215,412 A 7/1980 Bernier et al.
6,466,858 B1 10/2002 Adibhatla et al.
(Continued)

FOREIGN PATENT DOCUMENTS

BY 10276 C1 2/2002
BY 10276 C1 2/2008
(Continued)

OTHER PUBLICATIONS

RU office action dated Nov. 14, 2017, for RU patent application No. 2016132181.
(Continued)

*Primary Examiner* — Qing Yuan Wu
(74) *Attorney, Agent, or Firm* — Beusse Wolter Sanks & Maire

(57) ABSTRACT

A method for determining a deviation value of a health parameter, in particular a capacity or efficiency parameter, of at least one component of a gas turbine. A pressure value and temperature value at a measuring point of the component is measured. A corrected pressure value is determined based on a predetermined pressure correction factor of the component. A corrected temperature value is determined based on a predetermined temperature correction factor of the component. An estimated actual value of the health parameter of the component is determined based on the corrected pressure value, the corrected temperature value and measured shaft speed. A nominal value of the health parameter of the component which is predicted based on at least one predetermined input parameter is determined. Finally, a deviation value of a health parameter is determined by comparing the estimated actual value and the nominal value.

10 Claims, 5 Drawing Sheets

(51) Int. Cl.
    *G05B 17/02* (2006.01)
    *G05B 23/02* (2006.01)

(52) U.S. Cl.
    CPC ..... *G05B 23/0243* (2013.01); *G05B 23/0283* (2013.01); *F05D 2260/80* (2013.01); *F05D 2260/81* (2013.01); *G05B 17/02* (2013.01)

(56) References Cited

U.S. PATENT DOCUMENTS

| | | | |
|---|---|---|---|
| 6,892,127 B2 | 5/2005 | Wiseman | |
| 8,050,843 B2 | 11/2011 | Von Hoff et al. | |
| 2004/0148139 A1* | 7/2004 | Nguyen | G05B 23/0221 702/189 |
| 2007/0214796 A1 | 9/2007 | Bland et al. | |
| 2008/0154473 A1 | 6/2008 | Volponi et al. | |
| 2012/0191427 A1 | 7/2012 | Cianflone et al. | |

FOREIGN PATENT DOCUMENTS

| | | |
|---|---|---|
| CN | 101206685 A | 6/2008 |
| CN | 102434291 A | 5/2012 |
| DE | 4023663 A1 | 2/1991 |
| EP | 1418481 A1 | 5/2004 |
| EP | 1420318 A2 | 5/2004 |
| RU | 2389978 C2 | 5/2010 |
| SU | 1700274 A1 | 12/1991 |

OTHER PUBLICATIONS

CN office action dated Feb. 1, 2018, for CN patent application No. 201580007333.

Panov V, "Gasturbolib—Simulink Library for Gas Turbine Engine Modelling", pp. 1-11, Proceedings of ASME Turbo Expo 2009: Power for Land, Sea and Air, GT2009, Jun. 8-12, 2009, Orlando, FL USA.

Panov V, "Model-Based Control and Diagnostic Techniques for Operational Improvements of Gas Turbine Engines", pp. 1-12, 10th European Conference on Turbomachinery Fluid dynamics & Thermodynamics; ETC10, Apr. 15-19, 2013, Lappeenranta, England.

Panov V, "Distributed Network System for Real-Time Model Based Control of Industrial Gas Turbines", pp. 1-9, Proceedings of ASME Turbo Expo 2011, GT2011, Jun. 6-10, 2011, Vancouver, Canada. GT2011-45298; 2011.

Bulat G et al, "Combustion Components Integrity Monitoring", pp. 1-2, Siemens AG, Germany.

* cited by examiner

ESTIMATION OF HEALTH PARAMETERS IN INDUSTRIAL GAS TURBINES

CROSS REFERENCE TO RELATED APPLICATIONS

This application is the U.S. National Stage of International Application No. PCT/EP2015/050335 filed Jan. 9, 2015, and claims the benefit thereof. The International Application claims the benefit of European Application No. EP14154261 filed Feb. 7, 2014. All of the applications are incorporated by reference herein in their entirety.

FIELD OF INVENTION

The present invention relates to a method for determining a deviation value of a health parameter of at least one component of a gas turbine. Furthermore, the present invention relates to a control unit for a gas turbine.

ART BACKGROUND

Industrial gas turbines include a plurality of sensors that are used to monitor and control a gas turbine. Not all of the engine parameters can be measured or they can be measured only with reduced accuracy. Devised method outputs which estimate non-measured parameters such as efficiencies and flow capacities (so-called health parameters) for different engine components are typically used for health monitoring of gas turbine engines.

There exist many reasons for a variation of the health parameters. For example, the deviation of the health parameters is caused by manufacturing and assembly variation found in new built engines. On another hand, over the lifetime of operation, gas turbine components undergo some amount of degradation and this deterioration may be gradual or abrupt.

Some of the known deterioration mechanisms are seal and secondary flow leaks, clearance increases, erosion and fouling. While gas turbine health deterioration is a normal aging process that occurs in all engines as a result of usage, abrupt abnormal event such as foreign object damage are not predictable as they happen unexpectedly.

Various methods for monitoring the performance and the health of gas turbines have been devised in the past. Those methods are capable of providing diagnostic information such as the detection of engine fault or engine degradation and provide prognostic information such as the time the engine can be operated until maintenance procedures are required.

US 2007/214796 A discloses a method and system for monitoring a health of a combustion dynamics sensing system. Respective dynamic conditions of at least two combustor cans of a can annular combustor of a gas turbine engine are monitored with respective dynamic condition sensors associated with each of the cans. The method also includes establishing a baseline relationship between the respective dynamic conditions and then identifying a variance from the baseline relationship indicative of a degraded signal quality provided by a dynamic condition sensor associated with at least one of the cans.

U.S. Pat. No. 4,215,412 discloses a real-time gas turbine engine monitoring system is disclosed which includes a digital processor that utilizes a set of scalar coefficients and the current value of various engine operating parameters to predict the current value of a set of engine performance parameters. The actual values of these performance parameters are monitored and compared with the predicted values to supply deviation or error signals to monitor logic which provides an indication of faults within the digital processor, within the sensor units which provide the actual values of the monitored performance parameters and within the gas turbine engine. In addition, the deviation signals are utilized within the digital processor unit to determine a time dependent quadratic estimate of the temporal characteristics of each monitored engine parameter.

U.S. Pat. No. 6,466,858 discloses model-based trending process for a gas turbine engine that generates, in real-time, engine trend parameters from engine sensor data and ambient flight condition data to assess engine condition is described. The engine includes a plurality of sensors that are responsive to engine operations. The trending process is implemented using a commercially available processor coupled to the engine to monitor the engine operations, and having the desired processing speed and capacity. Engine health parameters are estimated and adjusted in a model for component diagnostics and fault detection and isolation.

U.S. Pat. No. 6,892,127 discloses a method and an apparatus for assessing damage to machine components is provided. The method includes calculating an expected parameter value based on a first parameter value indicator, calculating an estimate of an actual parameter value based on a second parameter value indicator, the second parameter value indicator being different than the first parameter value indicator, determining if the calculated expected parameter value is different than the calculated estimate of the actual parameter value by a predefined limit, and generating a damage flag based on a result of the comparison.

U.S. Pat. No. 8,050,843 discloses an estimation of a true health or independent parameter vector at time step uses the estimation of the true health or parameter vector at a previous time step as a starting value for the production of a predicted health parameter vector at time step. Based on the latter and a set of measured values of input variables of an extended model of the system, a prediction of output variables of the model is produced. This predicted model output is compared with measured values of the output variables to yield an error. From this error, a health parameter estimator in turn produces a health parameter estimate as a revision of the predicted health parameters.

DE 40 23 663 A1 discloses a diagnostic method. Vibration signals arising from the rotating parts of the machine are measured, prefiltered and digitized in a transient recorder. They are evaluated in a frequency range by frequency transformation. At least one characteristic value is obtained that represents the relation of the values of a harmonic frequency to a basic frequency over a predetermined period. A signal processor limits the frequency band and calculates the frequency function e.g. by a Fast-Fourier Transformation.

SUMMARY OF THE INVENTION

It may be an object to provide a devised method which estimates a dynamic behaviour of gas turbine health parameters, enabling in that way performance diagnostics under steady state and transient operating conditions of the gas turbine.

This object may be solved by a method for determining a deviation value of an operational parameter of at least one component of a gas turbine and by a control unit according to the independent claims.

According to a first aspect of the present invention, a method for determining a deviation value of a health parameter of at least one component of a gas turbine is presented. According to the method a pressure value and a temperature value at a measuring point of the component is measured. A corrected pressure value is determined on the basis of a predetermined pressure correction factor of the component. A corrected temperature value is determined on the basis of a predetermined temperature correction factor of the component. An estimated actual (e.g. efficiency and/or capacity) value of the health parameter (e.g. efficiency and/or capacity parameter) of the component is determined on the basis of the corrected pressure value and the corrected temperature value and/or e.g. shaft speed.

A nominal (e.g. efficiency and/or capacity) value of the health parameter of the component is predicted on the basis of at least one predetermined input parameter.

A (e.g. efficiency and/or capacity) deviation value of the health parameter is determined by comparing the estimated actual (e.g. efficiency and/or capacity) value of the health parameter and the nominal (e.g. efficiency and/or capacity) value of the health parameter.

According to a further aspect of the present invention a control unit for a gas turbine is presented, wherein the control unit is adapted such that the above described method is executable.

The component of the gas turbine may be for example a compressor, a combustor, a compressor turbine and a power turbine. Furthermore the component may also denote an interduct part/component which connects two components.

The parameters efficiency and capacity are also called health parameters of a component, because the efficiency and the capacity of a component may be indicative for a condition/health (damage, wearing etc.) of a component.

The estimated actual (e.g. efficiency or capacity) value denotes the efficiency $\eta$ and/or capacity $\Gamma$ of the component which is based on the corrected measurement values of the pressure and the temperature and e.g. a shaft speed of the component at a measurement point/station of the component. The temperature may define the temperature of a working fluid or of a component part at the measurement point. Hence, the estimated actual value is based on real measurable actual values of the component.

Exemplary calculation formulas for the estimated actual efficiency value and estimated actual capacity value are given below.

The nominal (e.g. efficiency or capacity) value is based on predetermined input parameters (such as fuel input, desired output power etc.) which are input into the component. The nominal (e.g. efficiency or capacity) value is based on theoretical values, e.g. for the pressure and the temperature, which theoretically exist if the component is driven with the predetermined input parameters. Hence, the theoretical values e.g. for the pressure and the temperature are based on the input parameters (i.e. performance parameters).

The input parameters are for example the fuel input into the gas turbine, the mass flow of the working fluid injected or drained off from the gas turbine or the respective component, a desired output power of the gas turbine or the respective component etc. For components of gas turbines it is theoretically known which temperature, pressure and/or shaft speed is existent at a measuring point of the component on the basis of specific inlet parameters for a desired operational state of the gas turbine and the component, respectively.

The nominal (e.g. efficiency or capacity) values and the temperature, pressure and/or shaft speed, respectively, may be derived from a real time model/simulation or from laboratory tests of a prototype of the gas turbine or the component.

The (e.g. efficiency or capacity) deviation value is determined by comparing the estimated actual (e.g. efficiency or capacity) value and the nominal (e.g. efficiency or capacity) value. The (e.g. efficiency or capacity) deviation value is indicative of a deviation between the theoretical nominal (e.g. efficiency or capacity) values (for new and clean engine) and the estimated actual (e.g. efficiency or capacity) value, which is based on physical measurements in the operating state of the gas turbine and the component, respectively.

By the approach of the present invention, a deviation value of the efficiency and/or of the capacity of the component may be determined by comparing the estimated actual efficiency (and/or capacity) value and the nominal efficiency (and/or capacity) value.

Summarizing, health parameters (i.e. the estimated actual efficiency or capacity) of industrial gas turbine are determined with the aid of measurements during operations of the gas turbine. Measured variables, such as pressures, temperatures and rotational speeds are used to estimate calculated variables for the efficiency and capacity. Besides the health parameters, these non-measured variables typically include: estimated generated power, estimated pressures and estimated temperatures which are difficult\not practical to measure, such as high pressure turbine entry temperature. Estimated health parameters are usually represented by estimated actual efficiency and (flow) capacities of the engine components. As they deviate from their normal health conditions (i.e. the nominal efficiency or capacity value) the performance delivered by each component degrades, and this can be recognized as a shift in component characteristic. Generally speaking, it can be recognized two main reasons for engine performance deviation: engine-to-engine variations and engine deterioration. The method according to the present invention relates to a method for estimation of non-measured\health parameters in industrial gas turbine, which are used for monitoring the health of operating gas turbine engine under steady state and transient conditions.

According to the described method, pressure and temperature measurements in the gas turbine gas path at various stations (measurement points at a specific component) are accomplished. If the gas turbine is a twin shaft gas turbine, also the speed of the component of the gas generator and of the power turbine shaft may be considered.

In the following list, measured shaft speeds, measured temperature values T and measured pressure values P for specific components the gas turbine are listed:

TABLE 1

| No | Description/Component | Sensor Type | Notation |
|----|----------------------|-------------|----------|
| 1 | Compressor inlet | Pressure | $P_{in}$ |
| 2 | Compressor inlet | Temperature | $T_{in}$ |
| 3 | Compressor delivery | Pressure | $P_{cd}$ |
| 4 | Compressor delivery | Temperature | $T_{cd}$ |
| 5 | Inter-duct | Pressure | $P_{id}$ |
| 6 | Inter-duct | Temperature | $T_{id}$ |
| 7 | Exhaust | Temperature | $T_{ex}$ |
| 8 | Gas generator shaft | Speed | $n_{gg}$ |
| 9 | Power turbine shaft | Speed | $n_{pt}$ |

According to a further exemplary embodiment of the present invention, the pressure correction factor is determined by determining a ratio between an upstream pressure value at an upstream station located upstream of the measuring point of the component and a downstream pressure value at a downstream station located downstream of the measuring point of the component.

Furthermore, according to a further exemplary embodiment of the present invention, the temperature correction factor is determined by determining a ratio between an upstream temperature value at an upstream station located upstream of the measuring point of the component and a downstream temperature value at a downstream station located downstream of the measuring point of the component.

The corrected temperature and pressure values may be determined as the arithmetic average between a respective pressure or temperature value at an upstream inlet and a downstream outlet of a specific component.

Hence, the gas path measurements (pressure, temperature) at the measuring point\station of the component are then corrected by the above described correction factors to represent an value of the pressure or the temperature at calculation point\station.

For example, engine instrumentation (sensors) provide measurements of pressure and temperature in an e.g. interduct component (i.e. $P_{id}$, $T_{id}$ in Table 1). The interduct component in the engine gas path is located e.g. between the compressor turbine component (CT) and the power turbine component (PT). At the outlet of the compressor turbine, which is an upstream located component with respect to the interduct component, and the inlet of the power turbine, which is a downstream located component with respect to the interduct component, respective corrected measurements of pressure and temperature are accomplished by use of the respective correction factor for the corresponding measurements (pressure, temperature). Hence, the measured pressure value and temperature value at the measuring point in the interduct component are corrected to account for compressor turbine (CT) outlet and power turbine (PT) inlet location mismatch.

The correction factor may be calculated also in other ways for other components. For example, if the component is a compressor turbine (CT), the measurement of some parameters, such as the turbine inlet temperature (TIT) is very difficult and impractical, because of the extremely high temperature at the inlet of the compressor turbine. Hence, TIT calculation is based on energy balance for gas generator (compressor and CT), and is calculated using measurements at different gas turbine locations:

$$TIT = T_{id} + K_{TIT}(T_{cd} - T_{in});$$

wherein:
Tid=Interduct temperature within an interduct component upstream of the inlet of the compressor turbine component;
KTIT=predefined correction factor In the following Table 2 corrected temperature values and pressure values measurements for specific components of the gas turbine and correction factors α are listed. Above measurements shown in Table 1 may be used to synthesize gas turbine corrected measurements which correspond to different components:

TABLE 2

Gas turbine corrected measurements

| No | Description/Component | Sensor Type | Notation |
| --- | --- | --- | --- |
| 1 | Compressor inlet | Pressure | $P_{comp\_in} = \alpha_{Pcomp\_in} P_{in}$ |
| 2 | Compressor inlet | Temperature | $T_{comp\_in} = \alpha_{Tcomp\_in} T_{in}$ |
| 3 | Compressor exit | Pressure | $P_{comp\_out} = \alpha_{Pcomp\_out} P_{cd}$ |
| 4 | Compressor exit | Temperature | $T_{comp\_out} = \alpha_{Tcomp\_out} T_{cd}$ |
| 5 | CT inlet | Pressure | $P_{ct\_in} = \alpha_{Pct\_in} P_{cd}$ |
| 6 | CT inlet | Temperature | $T_{ct\_in} = \alpha_{Tct\_in} TIT$ |
| 7 | CT exit | Pressure | $P_{ct\_out} = \alpha_{Pct\_out} P_{id}$ |
| 8 | CT exit | Temperature | $T_{ct\_out} = \alpha_{Tct\_out} T_{id}$ |

TABLE 2-continued

Gas turbine corrected measurements

| No | Description/Component | Sensor Type | Notation |
| --- | --- | --- | --- |
| 9 | PT inlet | Pressure | $P_{pt\_in} = \alpha_{Ppt\_in} P_{id}$ |
| 10 | PT inlet | Temperature | $T_{pt\_in} = \alpha_{Tpt\_in} T_{id}$ |
| 11 | PT exit | Pressure | $P_{pt\_out} = \alpha_{Ppt\_out} P_{in}$ |
| 12 | PT exit | Temperature | $T_{pt\_out} = \alpha_{Tpt\_out} T_{ex}$ | wherein:
CT=compressor turbine component and
PT=power turbine component

The corrected measurement (temperature, pressure) values (see e.g. in Table 2) at different components of the gas turbine stations are now used to calculate estimated values/health parameters. The calculation may be carried out simultaneously e.g. for two sets of parameters, namely the efficiency and the capacity of a component. Exemplary estimated efficiency and capacity parameters for specific components of the gas turbine are listed in Table 3:

TABLE 3

| No | Component | Parameter | Notation |
| --- | --- | --- | --- |
| 1 | Compressor | Efficiency | $\eta_{comp}$ |
| 2 | Compressor | Capacity | $\Gamma_{comp}$ |
| 3 | Combustor | Capacity | $\Gamma_{comb}$ |
| 4 | Compressor turbine | Efficiency | $\eta_{ct}$ |
| 5 | Compressor turbine | Capacity | $\Gamma_{ct}$ |
| 6 | Power turbine | Efficiency | $\eta_{pt}$ |
| 7 | Power turbine | Power | $N_{pt}$ |

As can be taken from Table 3, a first set of selected health parameters describes component estimated actual efficiencies. Following component efficiencies may be calculated dependent on the specific component by various formulas, which are described exemplarily below. The calculations of polytrophic efficiencies are used to represent efficiency of following components:

Compressor Polytrophic Efficiency:

$$\eta_{comp} = \frac{\gamma_{comp} - 1}{\gamma_{comp}} \frac{\ln\left(\frac{P_{comp\_out}}{P_{comp\_in}}\right)}{\ln\left(\frac{T_{comp\_out}}{T_{comp\_in}}\right)} \quad (1)$$

Compressor Turbine Polytrophic Efficiency:

$$\eta_{ct} = \frac{\gamma_{ct}}{1 - \gamma_{ct}} \frac{\ln\left(\frac{T_{ct\_out}}{T_{ct\_in}}\right)}{\ln\left(\frac{P_{ct\_in}}{P_{ct\_out}}\right)} \quad (2)$$

Power Turbine Polytrophic Efficiency:

$$\eta_{pt} = \frac{\gamma_{pt}}{1 - \gamma_{pt}} \frac{\ln\left(\frac{T_{pt\_out}}{T_{pt\_in}}\right)}{\ln\left(\frac{P_{pt\_in}}{P_{pt\_out}}\right)} \quad (3)$$

where ratio of specific heats for working fluid (air and hot gas flowing through the components) is defined with polynomial relation:

$$\gamma = \gamma_0 + \gamma_1 T + \gamma_2 T^2 + \gamma_3 T^3 + \gamma_4 T^4 \qquad (4)$$

Efficiencies for other components, such as for the compressor turbine and the power turbine, be calculated by using the above listed formulas, respectively.

According to a further exemplary embodiment of the present invention, a shaft speed of a rotating shaft of the component is measured. The nominal component capacity value, which is based on predetermined component input parameters, is provided. The nominal capacity value is based on theoretical values, e.g. for the pressure, temperature and speed, which theoretically exist if the component is driven with the predetermined input parameters. An estimated actual capacity value of the component is determined on the basis of the corrected pressure value, the corrected temperature value and the shaft speed. A capacity deviation value is determined by comparing the estimated actual capacity value and the nominal capacity value.

As can be taken from Table 3, a second set of selected health parameters describes component estimated actual capacities and the power of a power turbine component of the gas turbine. Following component capacities and the power of the power turbine may be calculated by various formulas, which are described exemplary below. The estimated capacity parameters need beside corrected gas path measurements (temperature, pressure) listed in Table 2 e.g. the shaft speed of the gas turbine. In case that the gas turbine comprises a two-shaft embodiment, i.e. a gas generator component and a power turbine component, measured gas generator shaft speed and power turbine shaft speed are used as additional input parameters. Hence, the measured speed and acceleration of the gas generator shaft and the power turbine shaft may be involved in the calculation process which allows the inventive method to capture dynamic behavior of selected gas turbine health parameters i.e. the estimated capacity.

The following capacities are estimated by the method for example for the following components: compressor capacity, compressor turbine capacity and combustor capacity. These capacities may be calculated by the following equitation:

COMPRESSOR CAPACITY:

$$\Gamma_{comp} = M_{comp} \Gamma_{comp} \frac{\sqrt{T_{comp\_in}}}{P_{comp\_in}} \bigg/ \frac{\sqrt{TIT}}{P_{cd}} \qquad (5)$$

Compressor Turbine Capacity:

$$\Gamma_{ct} = M_{ct} \Gamma_{comb} \frac{\sqrt{T_{ct\_in}}}{P_{ct\_in}} \bigg/ \frac{\sqrt{TIT}}{P_{cd}} \qquad (6)$$

Combustor Capacity:

$$\Gamma_{comb} = \frac{\sqrt{TIT}}{P_{cd}} \left( \Gamma_{pt} \frac{P_{pt\_in}}{\sqrt{T_{pt\_in}}} - \delta_{ct\_pt} \Gamma_{comp} \frac{P_{comp\_in}}{\sqrt{T_{comp\_in}}} \right) \qquad (7)$$

Where power turbine capacity:

$$\Gamma_{pt} = f(P_{pt\_in}, P_{pt\_out}, T_{pt\_in}, n_{pt}) \qquad (8)$$

is deduced from predetermined component characteristic.

The calculation in particular of the capacities is described more in detail by reference to the figures.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
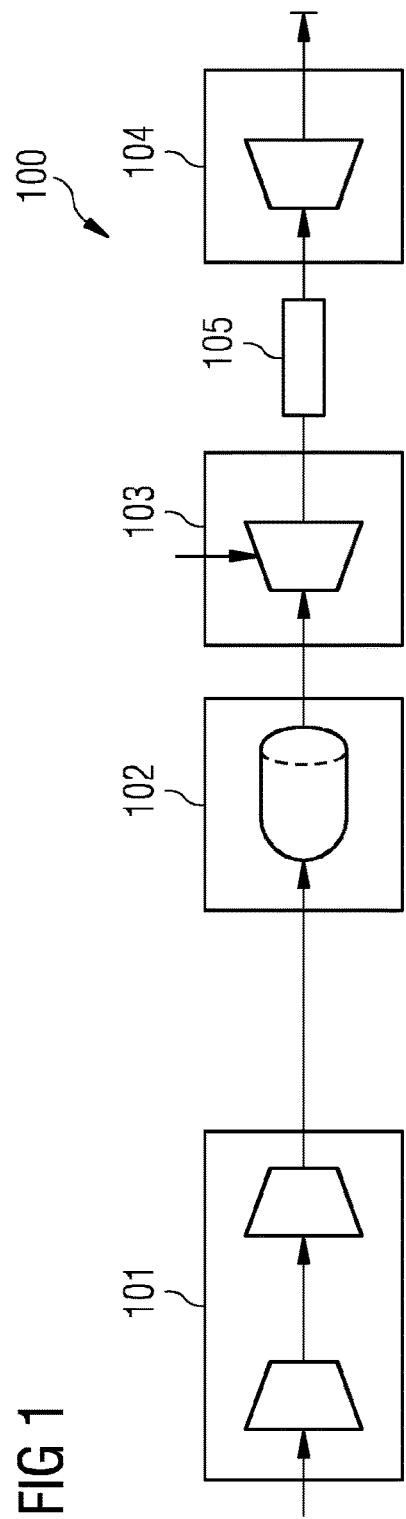
FIG. 1 shows a schematical view of a gas turbine.

The illustration in the drawings is in schematic form. It is noted that in different figures, similar or identical elements are provided with the same reference signs.

FIG. 1 shows a gas turbine 100 according to an exemplary embodiment of the present invention. The gas turbine 100 comprises a plurality of gas turbine components 101, 102, 103, 104, 105 which are described in the following.

The gas turbine 100 comprises a gas generator device which is adapted for generating pressurized working fluid. The gas generator device comprises a compressor 101, a combustor 102 and a compressor turbine 103. A working fluid, such as air, is injected into the compressor 101. The compressor 101 pressurizes the working fluid.

The arrows in FIG. 1 show the flow direction of the working fluid. Downstream of the compressor 101, fuel is injected into the combustor 102. The working fluid, i.e. a part of the working fluid, is mixed with the fuel and is burned. The combustor 102 generates pressurized, high energized working fluid which drives the compressor turbine 103 such that mechanical energy is generated for driving the compressor 101, respectively.

The hot pressurized, high energized working fluid is guided through an interduct 105 to the power turbine 104. The pressurized hot working fluid drives the power turbine 104 for generating torque.

Figure 2:
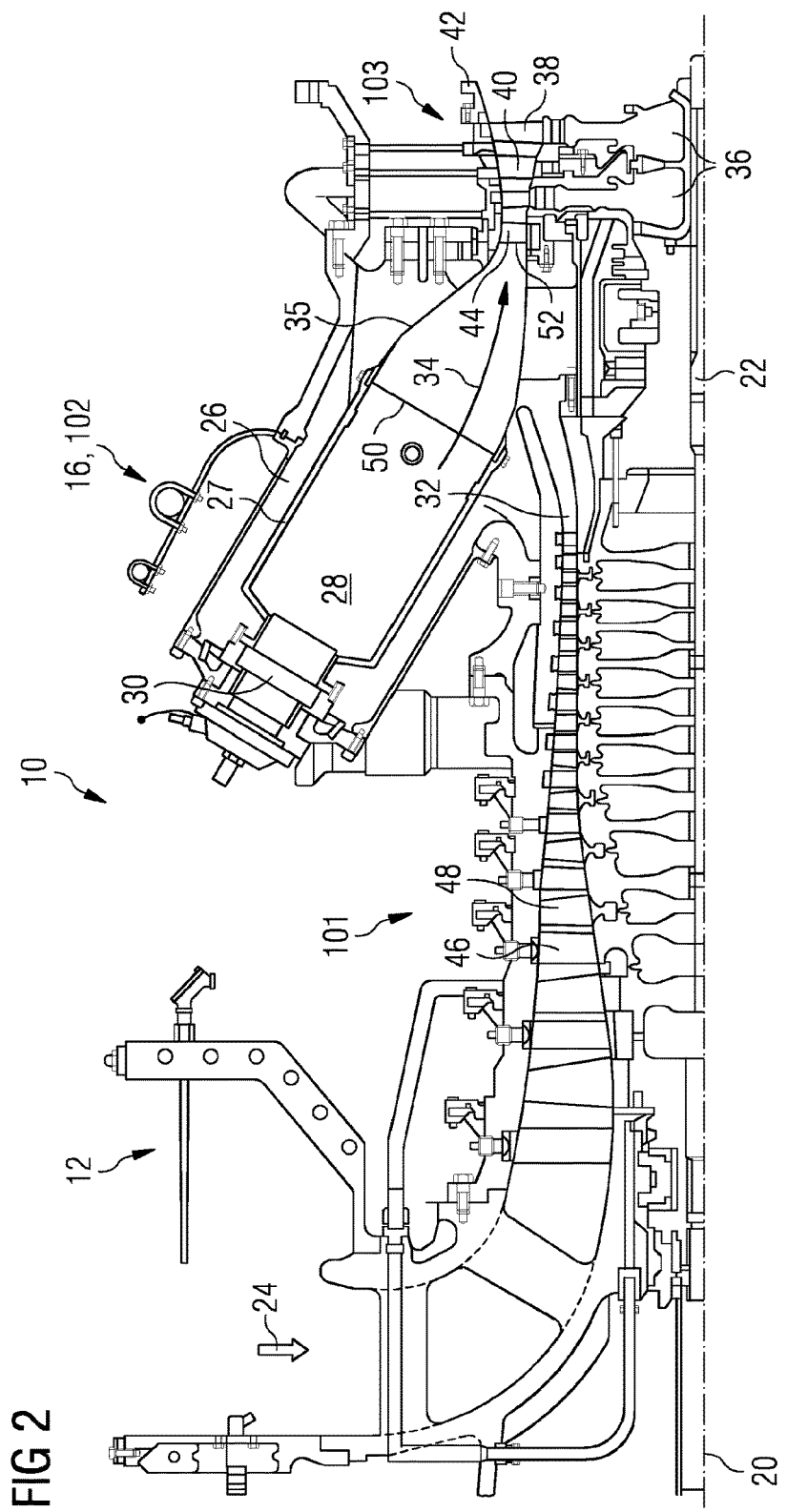
FIG. 2 shows a schematical view of a compressor, a combustor and a compressor turbine of a gas turbine as shown in FIG. 1.

FIG. 2 shows schematically a compressor 101, a combustor 102, compressor turbine 103, power turbine 104, and a interduct 105 of a gas turbine 100 as shown in FIG. 1 in more detail.

The terms upstream and downstream refer to the flow direction of the airflow and/or working gas flow through the engine unless otherwise stated. The terms forward and rearward refer to the general flow of gas through the engine. The terms axial, radial and circumferential are made with reference to a rotational axis 20 of the engine.

The gas turbine 100 comprises, in flow series, an inlet 12, a compressor 101, a combustor 102 and a turbine 103 which are generally arranged in flow series and generally in the direction of a longitudinal or rotational axis 20. The gas turbine 100 further comprises a shaft 22 which is rotatable about the rotational axis 20 and which extends longitudinally through the gas turbine 100. The shaft 22 drivingly connects the turbine 103 to the compressor 101.

In operation of the gas turbine 100, air 24, which is taken in through the air inlet 12 is compressed by the compressor 101 and delivered to the combustor 102 comprising a burner section 16. The burner section 16 comprises a burner plenum 26, one or more combustion chambers 28 defined by a double wall can 27 and at least one burner 30 fixed to each combustion chamber 28. The combustion chambers 28 and the burners 30 are located inside the burner plenum 26. The compressed air passing through the compressor 12 enters a diffuser 32 and is discharged from the diffuser 32 into the burner plenum 26 from where a portion of the air enters the burner 30 and is mixed with a gaseous or liquid fuel. The air/fuel mixture is then burned and the combustion gas 34 or working gas from the combustion is channeled via a transition duct 35 to the turbine 103.

The turbine 103 comprises a number of blade carrying discs 36 attached to the shaft 22. In the present example, two discs 36 each carry an annular array of turbine blades 38. However, the number of blade carrying discs could be different, i.e. only one disc or more than two discs. In addition, guiding vanes 40, which are fixed to a stator 42 of the gas turbine 100, are disposed between the turbine blades 38. Between the exit of the combustion chamber 28 and the leading turbine blades 38 inlet guiding vanes 44 are provided.

The combustion gas from the combustion chamber 28 enters the turbine 103 and drives the turbine blades 38 which in turn rotates the shaft 22. The guiding vanes 40, 44 serve to optimise the angle of the combustion or working gas on to the turbine blades 38. The compressor 100 comprises an axial series of guide vane stages 46 and rotor blade stages 48.

Figure 3:
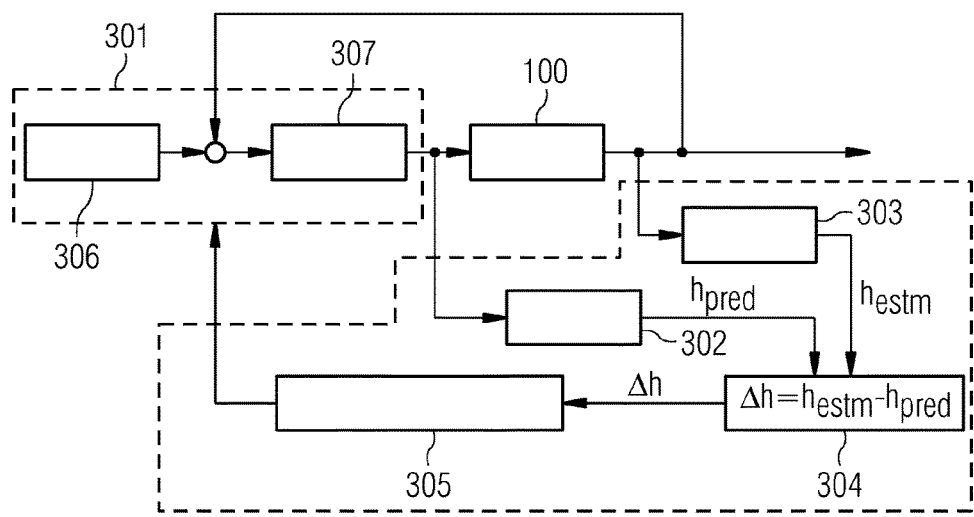
FIG. 3 shows a schematical view of a control system of a gas turbine according to an exemplary embodiment of the present invention.

FIG. 3 shows schematically a control system 301 for controlling the gas turbine 100. The control system 301 comprises an input unit 306 and a control unit 307. A desired power output or input values may be input by the input unit 306 to the control unit 307. The control unit 307 calculates respective values for the control parameters of the gas turbine 100 on the basis of the desired input values (which are desired to be achieved by the gas turbine 100). The control parameters may be for example the fuel amounts injected in to the combustor 102 of the gas turbine 100. The control system 301 is coupled to the gas turbine 100, such that the gas turbine 100 is operated on the basis of the control parameters.

Furthermore, the control parameters may be used for a real-time model simulation of the gas turbine 100. On the basis of the control parameters, the real-time model simulation 302 calculates for example the nominal (e.g. efficiency or capacity) value ($h_{pred}$) for the gas turbine or the respective component 101 to 105 of the gas turbine 100.

Furthermore, a health parameter estimation unit 303 is coupled to the gas turbine 100, such that the pressure value, a temperature value and/or a shaft speed at a certain predefined measuring point at a specific component 101 to 105 can be measured.

On the basis of the measured values for the temperature, the pressure and/or the shaft speed, the health parameter estimation unit 303 calculates an estimated actual (e.g. efficiency or capacity) value ($h_{estm}$) of the respective component 101 to 105.

A deviation value unit 304 is coupled to the real-time model unit 302 and the health parameter estimation unit 303 for receiving the nominal value ($h_{pred}$), i.e. the nominal efficiency value and/or the nominal capacity value, and the estimated actual value ($h_{estm}$), i.e. the estimated actual efficiency value and/or the estimated capacity value. On the basis of the nominal efficiency value and/or the nominal capacity value and the estimated actual efficiency value and/or the estimated capacity value, the deviation value unit 304 calculates the deviation value Δh (e.g. by the formula: $Δh = h_{pred} - h_{estm}$), i.e. the efficiency deviation value and/or the capacity deviation value.

The deviation value Δh may be provided for a diagnostic unit 305 which is coupled to the deviation value unit 304. On the basis of the deviation value Δh, diagnostic analysis and prognostic analysis may be conducted in order to estimate a dynamic behaviour of gas turbine health under steady state and transient operating conditions of the gas turbine 100.

Figure 4:
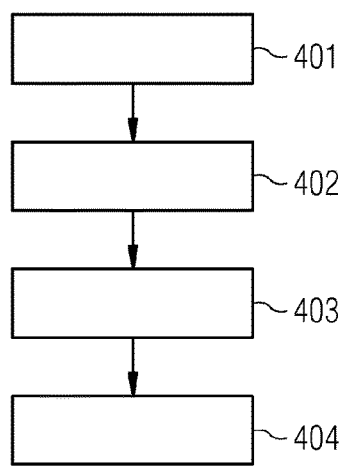
FIG. 4 shows a schematical view of the method steps according to an exemplary embodiment of the present invention.

FIG. 4 shows a flowchart which shows the essential steps of the method according to an exemplary embodiment of the present invention. According to the method a pressure value, a temperature value and e.g. a shaft speed at a measuring point of the component 101, 102, 103, 104, 105 is measured (see step 401).

A corrected pressure value is determined on the basis of a predetermined pressure correction factor of the component 101, 102, 103, 104, 105. A corrected temperature value is determined on the basis of a predetermined temperature correction factor of the component 101, 102, 103, 104, 105 (see step 402).

An estimated actual (e.g. efficiency or capacity) value of the component 101, 102, 103, 104, 105 is determined on the basis of the corrected pressure value, the corrected temperature value and e.g. a shaft speed. A nominal (e.g. efficiency or capacity) value of the component 101, 102, 103, 104, 105 which is predicted on the basis of at least one predetermined input parameter is determined (see step 403).

Finally, a (e.g. efficiency or capacity) deviation value (η) is determined by comparing the estimated actual (e.g. efficiency or capacity) value and the nominal (e.g. efficiency or capacity) value (see step 404).

The nominal (e.g. efficiency or capacity) value of the components 101, 102, 103, 104, 105 is predicted on the basis of at least one predetermined input parameter calculated by the control unit 307.

The parameters efficiency and capacity are called health parameters of a component 101, 102, 103, 104, 105, because the efficiency and the capacity of a component may be indicative for a condition/health (damage, wearing etc.) of a component 101, 102, 103, 104, 105.

The estimated actual (e.g. efficiency or capacity) value denotes the efficiency or capacity, respectively, of the component which is based on the corrected measurement values of the pressure and the temperature at a measurement point of the component 101, 102, 103, 104, 105. The temperature may define the temperature of a working fluid or of a component 101, 102, 103, 104, 105 at the measurement point. Hence, the estimated actual efficiency value is based on real measurable actual values of the component 101, 102, 103, 104, 105.

Exemplary calculation formulas for the estimated actual efficiency and capacity value are given below.

The nominal (e.g. efficiency or capacity) value is based on predetermined input parameters (such as fuel input, desired output power etc.) which are input by e.g. the input unit 306 or the control unit 307. The nominal (e.g. efficiency or capacity) value is based on theoretical values, e.g. for the pressure and the temperature, which theoretically exist if the component 101, 102, 103, 104, 105 is driven with the predetermined input parameters. Hence, the theoretical values e.g. for the pressure and the temperature are based on the input parameters (i.e. performance parameters).

The input parameters are for example the fuel input into the gas turbine, the mass flow of the working fluid injected or drained off from the gas turbine or the respective component, a desired output power of the gas turbine or the respective component etc. For the components 101, 102, 103, 104, 105 of the gas turbine 100 it is theoretically known which temperature, pressure and/or shaft speed is existent at a measuring point of the component 101, 102, 103, 104, 105 on the basis of specific inlet parameters for a desired operational state of the gas turbine and the component respectively.

The nominal (e.g. efficiency or capacity) values and the temperature, pressure and/or shaft speed, respectively, may be derived from a real time model/simulation unit 302 or from laboratory tests of a prototype of the gas turbine 100 or the component 101, 102, 103, 104, 105.

According to the described method, pressure and temperature measurements in the gas turbine gas path at various stations (measurement points at a specific component 101, 102, 103, 104, 105) are accomplished. If the gas turbine 100 is a twin shaft gas turbine, also the speed of the component 101, 102, 103, 104, 105 of the gas generator and of the power turbine shaft may be considered.

In Table 1 above, measured temperature values T and measured pressure values P for specific components 101, 102, 103, 104, 105 the gas turbine are listed.

The pressure correction factor is determined by determining a ratio between an upstream pressure value at an upstream measuring station located upstream of the measuring point of the component and a downstream pressure value at a downstream measuring station located downstream of the measuring point of the component 101, 102, 103, 104, 105.

The corrected temperature and pressure values may be determined as the arithmetic average between a respective pressure or temperature value at an upstream inlet and a downstream outlet of a specific component 101, 102, 103, 104, 105.

Hence, the gas path measurements (pressure, temperature) at the measuring point of the component 101, 102, 103, 104, 105 are then corrected by the above described correction factors to represent value of the pressure or the temperature at corresponding station.

For example, engine instrumentation (sensors) provide measurements of pressure and temperature in an e.g. interduct component (i.e. $P_{id}$, $T_{id}$ in Table 1). The interduct component 105 in the engine gas path is located e.g. between the compressor turbine component (CT) 103 and the power turbine component (PT) 104. At the outlet of the compressor turbine 103, which is an upstream located component with respect to the interduct component 105, and the inlet of the power turbine 104, which is a downstream located component with respect to the interduct component 105, respective measurements of pressure and temperature are accomplished by the use of the respective correction factors for the measurements (pressure, temperature). Next, the measured pressure value and temperature value at the measuring point of the interduct component 105 are corrected to account for CT outlet and PT inlet location mismatch.

The correction factor may be calculated also in other ways for other components. For example, if the component is a compressor turbine (CT) 103, the measurement of some parameters, such as the turbine inlet temperature (TIT) is very difficult and impractical, because of the extremely high temperature at the inlet of the compressor turbine 103. Hence, TIT is calculated using measurements at different gas turbine locations:

$$TIT = T_{id} + K_{TIT}(T_{cd} - T_{in});$$

The corrected measurement (temperature, pressure) values (see e.g. in Table 2) at different components 101, 102, 103, 104, 105 of the gas turbine 100 are now used to calculate estimated values/health parameters. The calculation may be carried out simultaneously e.g. for two sets of parameters, namely the efficiency and the capacity of a component. Exemplary estimated efficiency and capacity parameters for specific components of the gas turbine are listed in Table 3 above.

As can be taken from Table 3, a first set of selected health parameters describes component 101, 102, 103, 104, 105 estimated actual efficiencies. Following component efficiencies may be calculated dependent on the specific component by various formulas, which are described exemplarily below. The calculations of polytrophic efficiencies are used to represent efficiency η of following components:

Compressor Polytrophic Efficiency:

$$\eta_{comp} = \frac{\gamma_{comp} - 1}{\gamma_{comp}} \frac{\ln\left(\frac{P_{comp\_out}}{P_{comp\_in}}\right)}{\ln\left(\frac{T_{comp\_out}}{T_{comp\_in}}\right)} \quad (1)$$

Compressor Turbine Polytrophic Efficiency:

$$\eta_{ct} = \frac{\gamma_{ct}}{1 - \gamma_{ct}} \frac{\ln\left(\frac{T_{ct\_out}}{T_{ct\_in}}\right)}{\ln\left(\frac{P_{ct\_in}}{P_{ct\_out}}\right)} \quad (2)$$

Power Turbine Polytrophic Efficiency:

$$\eta_{pt} = \frac{\gamma_{pt}}{1 - \gamma_{pt}} \frac{\ln\left(\frac{T_{pt\_out}}{T_{pt\_in}}\right)}{\ln\left(\frac{P_{pt\_in}}{P_{pt\_out}}\right)} \quad (3)$$

where ratio of specific heats for working fluid (air and hot gas flowing through the components) is defined with polynomial relation:

$$\gamma = \gamma_0 + \gamma_1 T + \gamma_2 T^2 + \gamma_3 T^3 + \gamma_4 T^4 \quad (4)$$

Efficiencies for other components 101, 102, 103, 104, 105, such as for the compressor turbine 101 and the power turbine 104, be calculated by using the above listed formulas, respectively.

As can be taken from Table 3, a second set of selected health parameters describes component estimated actual capacities Γ and the power of a power turbine component 104 of the gas turbine 100. Following component capacities and the power of the power turbine 100 may be calculated by various formulas, which are described exemplary below. The estimated capacity parameters need beside corrected gas path measurements (temperature, pressure) listed in Table 2 e.g. the shaft speed of the gas turbine. In case that the gas turbine 100 comprises a two-shaft embodiment, i.e. a gas generator component and a power turbine component, measured gas generator shaft speed and power turbine shaft speed are used as additional input parameters. Hence, the measured speed and acceleration of the gas generator shaft and the power turbine shaft may be involved in the calculation process which allows the inventive method to capture dynamic behaviour of selected gas turbine health parameters i.e. the estimated capacity.

The following capacities Γ are estimated by the method for example for the following components: compressor capacity, compressor turbine capacity and combustor capacity. These capacities may be calculated by the following equitation:

Compressor Capacity:

$$\Gamma_{comp} = M_{comp} \Gamma_{comp} \frac{\sqrt{T_{comp\_in}}}{P_{comp\_in}} \bigg/ \frac{\sqrt{TIT}}{P_{cd}} \quad (5)$$

Compressor Turbine Capacity:

$$\Gamma_{ct} = M_{ct} \Gamma_{comb} \frac{\sqrt{T_{ct\_in}}}{P_{ct\_in}} \bigg/ \frac{\sqrt{TIT}}{P_{cd}} \quad (6)$$

Combustor Capacity:

$$\Gamma_{comb} = \frac{\sqrt{TIT}}{P_{cd}} \left( \Gamma_{pt} \frac{P_{pt\_in}}{\sqrt{T_{pt\_in}}} - \delta_{ct\_pt} \Gamma_{comp} \frac{P_{comp\_in}}{\sqrt{T_{comp\_in}}} \right) \quad (7)$$

Where power turbine capacity:

$$\Gamma_{pt} = f(P_{pt\_in}, P_{pt\_out}, T_{pt\_in}, n_{pt}) \quad (8)$$

is deduced from predetermined component characteristic.

Figure 5:
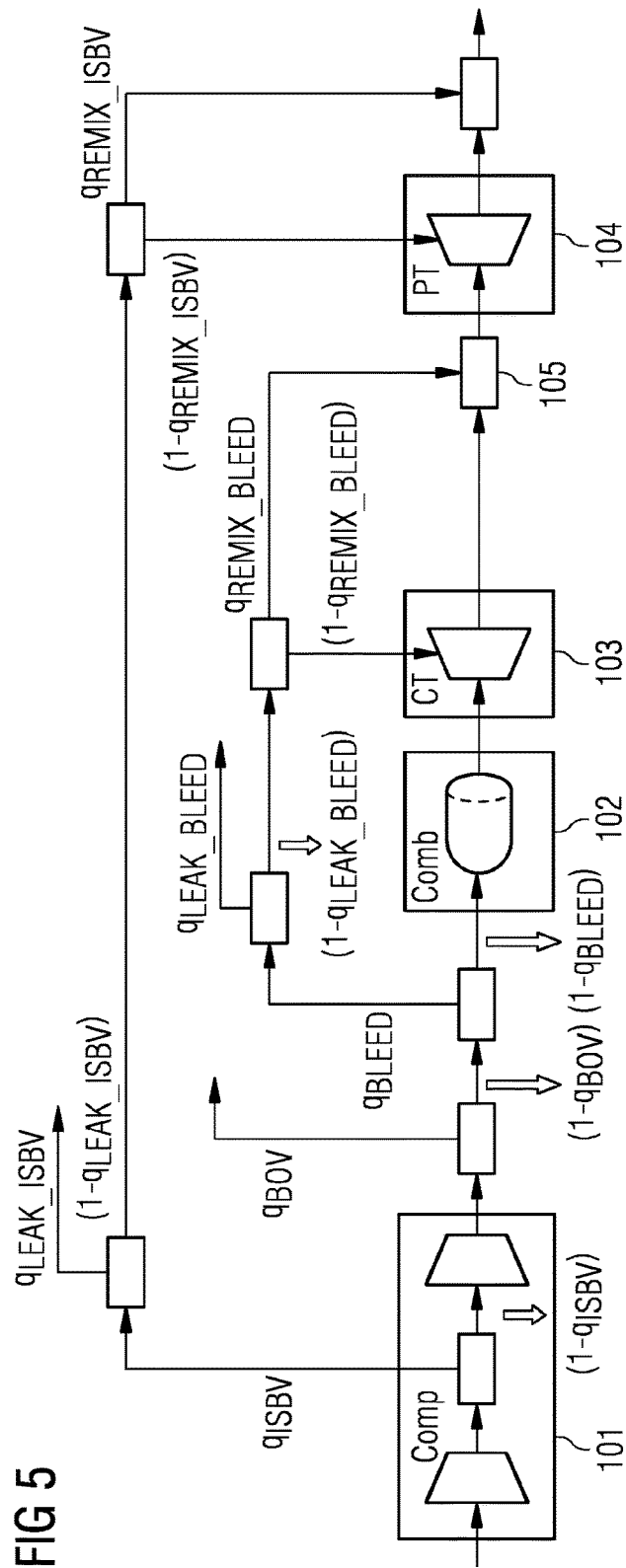
FIG. 5 shows a schematical view of the gas turbine in FIG. 1, wherein bleed fluid streams are shown.

FIG. 5 shows a schematical view of the gas turbine 100 in FIG. 1, wherein distribution of air streams is shown.

The variables for the above described formula (5), (6) and (7) may be calculated from the formula described below. The component capacities: $\Gamma_{comb}$, $\Gamma_{comp}$ and $\Gamma_{ct}$ may be calculated by considering the mass flows $\dot{m}$ of the working fluid flowing through the respective components. The power turbine capacity and $\Gamma_{pt}$ is deduced from predetermined component map, which is represented by 2D lookup table. Capacity is usually described in function of turbine pressure ratio and turbine speed.

Therefore, the bleed and cooling air streams $q_i$ shown in FIG. 5 have to be considered as described below:

| Combustor exit mass flow | Compressor inlet mass flow | Compressor turbine inlet mass flow | Power turbine inlet mass flow |
|---|---|---|---|
| $\dot{m}_{comb} = \Gamma_{comb} \frac{P_{cd}}{\sqrt{TIT}}$ (16) | $\dot{m}_{comp} = \Gamma_{comp} \frac{P_{comp\_in}}{\sqrt{T_{comp\_in}}}$ | $\dot{m}_{ct} = \Gamma_{ct} \frac{P_{ct\_in}}{\sqrt{T_{ct\_in}}}$ | $\dot{m}_{pt} = \Gamma_{pt} \frac{P_{pt\_in}}{\sqrt{T_{pt\_in}}}$ |

Component capacity multipliers are devised by normalizing component mass flows with i.e. the combustor mass flow rate:

| Compressor capacity multiplier | Compressor turbine capacity multiplier | Power turbine capacity multiplier |
|---|---|---|
| $M_{comp} = \frac{\dot{m}_{comp}}{\dot{m}_{comb}}$ | $M_{ct} = \frac{\dot{m}_{ct}}{\dot{m}_{comb}}$ | $M_{pt} = \frac{\dot{m}_{pt}}{\dot{m}_{comb}}$ |

The compressor capacity multiplier is derived from conservation of mass for gas generator:

$$M_{comp} = \frac{A-1}{\delta_{ct\_cool} - B} \quad <= \quad \dot{m}_{ct} = \dot{m}_{comb} + \delta_{ct\_cool} \dot{m}_{comp} \quad (17)$$

The compressor turbine (CT) cooling flow coefficient $\delta_{ct\_cool}$ in above equation is defined as:

$$\delta_{ct\_cool} = (1 - q_{ISBV})(1 - q_{BOV}) q_{BLEED} (1 - q_{LEAK\_BLEED})(1 - q_{REMIX\_BLEED})$$

where $q_i$ represents amount of air, which is bled off at specific location (See FIG. 5), wherein ISBV=Compressor (101) inter-stage bleed valve,
BOV=Blow-off\Bleed valve mounted at a centre casing,
BLEED=High pressure air bleed used for sealing and also cooling of turbine discs,
LEAK_BLEED=Air leak from BLEED stream, and
REMIX_BLEED=Air used for cooling of CT component Compressor turbine capacity multiplier is derived from conservation of mechanical energy for gas generator.

$$M_{ct} = \frac{A - \frac{B}{\delta_{ct\_cool}}}{1 - \frac{B}{\delta_{ct\_cool}}} \quad <= \quad \frac{dn_{gg}}{dt} = \frac{N_{ct} - N_{comp} - N_{gg\_loss}}{n_{gg} \left(\frac{\pi}{30}\right)^2 I_{gg}} \quad (9)$$

In above equations for compressor and compressor turbine capacity multipliers, terms A and B are defined as follows:

$$A = \frac{h_{gg} n_{gg} \left(\frac{\pi}{30}\right)^2 I_{gg} + L_{gg\_loss} n_{gg}^2}{\dot{m}_{comb} \int C_{p\_ct} dT} \quad (10)$$

Where $n_{gg}$ and $\dot{n}_{gg}$ are gas generator speed and acceleration respectively. Gas generator shaft losses are represented with loss coefficient $L_{gg\_loss}$, and $I_{gg}$ of the gas generator moment of inertia. In steady state ($\dot{n}_{gg} = 0$) term A reduces to:

$$A = \frac{L_{gg\_loss}n_{gg}^2}{\dot{m}_{comb}\int C_{p\_ct}dT}.$$

Term B is expressed as a ratio of specific works for compressor and compressor turbine components:

$$B = \frac{\int C_{p\_comp}dT}{\int C_{p\_ct}dT} \quad (11)$$

Specific heat for working fluid (air and hot gas) can be defined by fourth order polynomial relation:

$$C_p = C_{p0}(C_{p1} + C_{p2}T + C_{p3}T^2 + C_{p4}T^3 + C_{p5}T^4)$$

and hence specific work for working fluid could be found by integrating expression for specific heat over given temperature range:

Compressor specific work for air as a working fluid:

$$\int C_{p\_comp}dT$$

Turbine specific work for hot gas as working fluid:

$$\int C_{p\_ct}dT$$

Introducing component capacities $\Gamma_{pt}$ (power turbine capacity) and $\Gamma_{comb}$ (combustor capacity) into $$M_{pt} = \frac{\dot{m}_{pt}}{\dot{m}_{comb}},$$

a power turbine capacity multiplier can be expressed as follows:

$$M_{pt} = \Gamma_{pt}\frac{P_{pt\_in}}{\sqrt{T_{pt\_in}}} \Big/ \Gamma_{comb}\frac{P_{cd}}{\sqrt{TIT}} \quad (12)$$

where PT capacity is deduced from PT capacity component map:

$$\Gamma_{pt} = f(P_{pt\_in}, P_{pt\_out}, T_{pt\_in}, n_{pt})$$

By using determined power turbine capacity multiplier $M_{pt}$ and utilizing conservation of mechanical energy for power turbine (PT) shaft, expression for PT shaft power could be expressed as:

$$N_{pt} = \frac{1}{D}(M_{pt} - C) \quad <= \quad \frac{dn_{pt}}{dt} = \frac{N_{pt} - N_{pt\_load} - N_{pt\_loss}}{n_{pt}\left(\frac{\pi}{30}\right)^2 I_{pt}} \quad (13)$$

In above expression for power turbine (PT) shaft power, terms C and D are defined as follows:

$$C = \frac{\dot{n}_{pt}n_{pt}\left(\frac{\pi}{30}\right)^2 I_{pt} + L_{pt\_loss}n_{pt}^2}{\dot{m}_{comb}\int C_{p\_pt}dT} \quad (14)$$

$$D = \frac{1}{\dot{m}_{comb}\int C_{p\_pt}dT} \quad (15)$$

Where $n_{pt}$ and $\dot{n}_{pt}$ are power turbine (PT) shaft speed and acceleration respectively. Power turbine shaft losses are represented with loss coefficient $L_{pt\_loss}$, and $I_{pt}$ of the PT shaft moment of inertia.

In steady state ($\dot{n}_{pt}=0$) term C reduces to $$C = \frac{L_{pt\_loss}n_{pt}^2}{\dot{m}_{comb}\int C_{p\_pt}dT},$$

and hence following expression for PT shaft power in steady state can be used:

$$N_{pt} = \frac{1}{\dot{m}_{comb}\int C_{p\_pt}dT}\left(M_{pt} - \frac{L_{pt\_loss}n_{pt}^2}{\dot{m}_{comb}\int C_{p\_pt}dT}\right)$$

As described above, by using previously determined capacity multiplies $M_{comp}$ and $M_{ct}$, compressor and compressor turbine capacities can be expressed as follows:

Compressor Capacity $$\Gamma_{comp} = M_{comp}\Gamma_{comb}\frac{\sqrt{T_{comp\_in}}}{P_{comp\_in}} \Big/ \frac{\sqrt{TIT}}{P_{cd}} \quad (5)$$

Compressor Turbine Capacity $$\Gamma_{ct} = M_{ct}\Gamma_{comb}\frac{\sqrt{T_{ct\_in}}}{P_{ct\_in}} \Big/ \frac{\sqrt{TIT}}{P_{cd}} \quad (6)$$

To calculate combustor capacity and make this value available for the next calculation time step (FIG. 5), conservation of mass for power turbine component can be used:

$$<= \quad \dot{m}_{pt} = \dot{m}_{ct} + (\delta_{pt\_remix} + \delta_{pt\_cool})\dot{m}_{comp} \quad (7)$$

$$\Gamma_{comb} = \frac{\sqrt{TIT}}{P_{cd}}\left(\Gamma_{pt}\frac{P_{pt\_in}}{\sqrt{T_{pt\_in}}} - \delta_{ct\_pt}\Gamma_{comp}\frac{P_{comp\_in}}{\sqrt{T_{comp\_in}}}\right)$$

Compressor Turbine (CT) and power turbine (PT) cooling\remix air flow $\delta_{ct\_pt}$ in above expression can be determined as:

$$\delta_{ct\_pt} = \delta_{ct\_cool} + \delta_{pt\_remix} + \delta_{pt\_cool}$$

PT remix and cooling flow coefficients are defined as:

PT remix flow: $\delta_{pt\_remix} = (1-q_{ISBV})(1-q_{BOV})q_{BLEED}(1-q_{LEAK\_BLEED})q_{REMIX\_BLEED}$ PT cooling flow: $\delta_{pt\_cool} = q_{ISBV}(1-q_{LEAK\_ISBV})(1-q_{REMIX\_ISBV})$ where $q_i$ represents amount of air, which is bled off\remixed at specific location (ISBV-inter-stage bleed valve, BOV—Blow-off valve, etc., [FIG. 1.]):

ISBV=Compressor inter-stage bleed valve,
BOV=Blow-off\Bleed valve mounted at centre-casing,
BLEED=High pressure air bleed used for sealing and also cooling of turbine discs,
LEAK_BLEED=Air leak from BLEED stream,
REMIX_BLEED=Air used for cooling of CT component,
LEAK_ISBV=Air leak from compressor interstage bleed valve stream, and
REMIX_ISBV=Air used for PT sealing.

Figure 6:
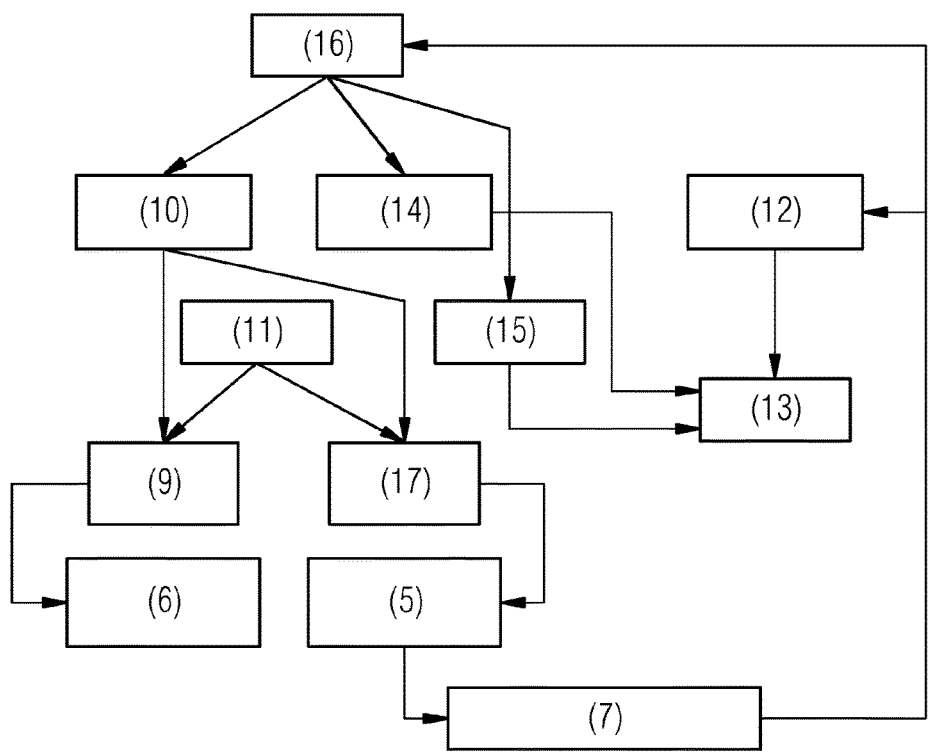
FIG. 6 shows a schematical view of an exemplary algorithm according to an exemplary embodiment of the present invention.

In FIG. 6, a schematical view of an exemplary algorithm according to an exemplary embodiment of the present invention is shown.

In particular, the interaction with the above described formulas is shown. In FIG. 6 it is outlined that the estimation of component capacities and PT shaft power is a recursive calculation and values of combustor capacity calculated in a previous time step may be considered. The numbers in FIG. 6 denote the number of the above described formula.

Hence the (e.g. efficiency or capacity) deviation value calculated by the inventive method may be compared with a further (e.g. efficiency or capacity) deviation value determined in a foregoing determination step by the inventive method for determining a variation of the (e.g. efficiency or capacity) deviation value over time.

At the end of each time step all estimated parameters are updated and available for further action\decision making.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

REFERENCE SIGNS

| | |
|---|---|
| 12 | inlet |
| 16 | burner section |
| 20 | rotational axis of the gas turbine |
| 22 | shaft |
| 24 | air |
| 26 | burner plenum |
| 27 | double wall can |
| 28 | combustion chamber |
| 30 | burner |
| 32 | diffuser |
| 34 | combustion gas |
| 35 | transition duct |
| 36 | blade carrying discs |
| 38 | turbine blades |
| 40 | guiding vanes |
| 42 | stator 42 |
| 44 | inlet guiding vanes |
| 46 | guide vane stages |
| 48 | rotor blade stages |
| 100 | gas turbine |
| 101 | compressor |
| 102 | combustor |
| 103 | compressor turbine |
| 104 | power turbine |
| 105 | interduct |
| 301 | control system |
| 302 | real time model unit |
| 303 | health parameter estimation unit |
| 304 | deviation value unit |
| 305 | diagnostic unit |
| 306 | input unit |
| 307 | control unit |
| 401 | measuring values |
| 402 | determining corrected values |
| 403 | determining estimated actual values |
| 404 | determining deviation values |

The invention claimed is:

1. A method for operating a gas turbine and determining a deviation value of a health parameter of at least one component of the gas turbine, the method comprising:
operating the gas turbine based on control parameters calculated by a control unit, wherein the control parameters are calculated based on desired input values received from an input unit,
monitoring by the control unit a health of the component of the gas turbine by:
measuring with sensors a pressure value and a temperature value at a measuring point of the component,
determining a corrected pressure value based on a predetermined pressure correction factor of the component applied to the measured pressure value,
determining a corrected temperature value based on a predetermined temperature correction factor of the component applied to the measured temperature value,
determining an estimated actual value of the health parameter of the at least one component at least based on the corrected pressure value and the corrected temperature value,
providing a nominal value of the health parameter of the at least one component which is predicted based on at least one predetermined input parameter,
determining a deviation value by comparing the estimated actual value of the health parameter and the nominal value of the health parameter, and
conducting diagnostic analysis and prognostic analysis based on the deviation value to estimate a dynamic behavior of gas turbine health under steady state and transient operating conditions for operation of the gas turbine.

2. The method according to claim 1,
wherein the health parameter is indicative of a condition or health of a component,
wherein the nominal value of the health parameter is determined by a real time model of the gas turbine or laboratory tests of the gas turbine, such that the nominal value represents a theoretical value based on a new and/or clean gas turbine.

3. The method according to claim 1, further comprising determining the predetermined pressure correction factor by determining a ratio between an upstream pressure value at an upstream station located upstream of the measuring point of the component and a downstream pressure value at a downstream station located downstream of the measuring point of the component.

4. The method according to claim 1, further comprising determining the predetermined temperature correction factor by determining a ratio between an upstream temperature value at an upstream station located upstream of the measuring point of the component and a downstream temperature value at a downstream station located downstream of the measuring point of the component.

5. The method according to claim 1,
wherein the health parameter is indicative of a condition or health of a component,
wherein the health parameter is an efficiency parameter, and the deviation value is an efficiency deviation value, and/or
wherein the health parameter is a capacity parameter, and the deviation value is a capacity deviation value.

6. The method according to claim 5, further comprising measuring a shaft speed of a rotating shaft of the component, and
using the shaft speed in addition to the pressure value and temperature value in determining the capacity deviation value.

7. The method according to claim 5, further comprising comparing the capacity deviation value of the capacity parameter with a further capacity deviation value of the capacity parameter determined in a foregoing determination step for determining a variation of the capacity deviation value over time.

8. The method according to claim 5, further comprising comparing the efficiency deviation value of the efficiency parameter with a further efficiency deviation value of the efficiency parameter determined in a foregoing determination step for determining a variation of the efficiency deviation value over time.

9. The method according to claim 1, further comprising measuring a further pressure value and a further temperature value at a further measuring point of a further component, determining a further corrected pressure value based on a further predetermined pressure correction factor of the further component, determining a further corrected temperature value based on a further predetermined temperature correction factor of the further component, determining a further estimated actual value of the health parameter of the further component based on the further corrected pressure value and the further corrected temperature value, and a further measured shaft speed, providing a further nominal value of the health parameter of the further component which is predicted based on at least one further predetermined input parameter, determining a further deviation value by comparing the further estimated actual value and the further nominal value.

10. A control system for a gas turbine, comprising:
an input unit,
a control unit,
wherein the control system is adapted to execute the method according to claim 1.

* * * * *